US009361482B2

(12) United States Patent
Shimizu

(10) Patent No.: US 9,361,482 B2
(45) Date of Patent: Jun. 7, 2016

(54) DEVICE SPECIFIC INFORMATION GENERATION DEVICE AND DEVICE SPECIFIC GENERATION METHOD

(75) Inventor: Koichi Shimizu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 60 days.

(21) Appl. No.: 14/361,543

(22) PCT Filed: Dec. 22, 2011

(86) PCT No.: PCT/JP2011/079820
§ 371 (c)(1),
(2), (4) Date: May 29, 2014

(87) PCT Pub. No.: WO2013/094056
PCT Pub. Date: Jun. 27, 2013

(65) Prior Publication Data
US 2014/0325241 A1    Oct. 30, 2014

(51) Int. Cl.
*G06F 21/75* (2013.01)
*G09C 1/00* (2006.01)
*H04L 9/08* (2006.01)
*H04L 9/32* (2006.01)

(52) U.S. Cl.
CPC *G06F 21/75* (2013.01); *G09C 1/00* (2013.01); *H04L 9/0866* (2013.01); *H04L 9/3278* (2013.01); *H04L 2209/12* (2013.01)

(58) Field of Classification Search
CPC ........................................................ G06F 21/75
USPC ......................................................... 713/192
See application file for complete search history.

(56) References Cited

U.S. PATENT DOCUMENTS

2008/0256600 A1   10/2008  Schrijen et al.
2010/0031065 A1    2/2010  Futa et al.
2012/0293354 A1*  11/2012  Suzuki ................. H03K 3/84
                                                341/173

FOREIGN PATENT DOCUMENTS

JP    2009 508430    2/2009
JP    2011 123909    6/2011
JP    2011 526113    9/2011
WO    2008 056612    5/2008
WO    2011 086688    7/2011

OTHER PUBLICATIONS

International Search Report Issued Jan. 24, 2012 in PCT/JP11/079820 Filed Dec. 22, 2011.

* cited by examiner

*Primary Examiner* — Jacob Lipman
(74) *Attorney, Agent, or Firm* — Oblon, McClelland, Maier & Neustadt, L.L.P.

(57) ABSTRACT

A device generating specific information of a semiconductor device includes a bit generation unit including a glitch generation circuit and a bit conversion circuit for converting a shape of the glitch into an information bit. The glitch generation circuit includes a plurality of combinational circuits mounted thereon to output a plurality of different glitches. The bit generation unit further includes a selector for selecting one glitch from among the plurality of different glitches in response to a selection signal to output the selected one glitch to the bit conversion circuit. The device further includes a performance evaluation/control unit for outputting the selection signal to obtain a piece of bit information corresponding to each of the plurality of different glitches and specifying a glitch satisfying a desired performance based on the respective pieces of bit information.

15 Claims, 14 Drawing Sheets

FLOWCHART OF INITIAL SETTINGS

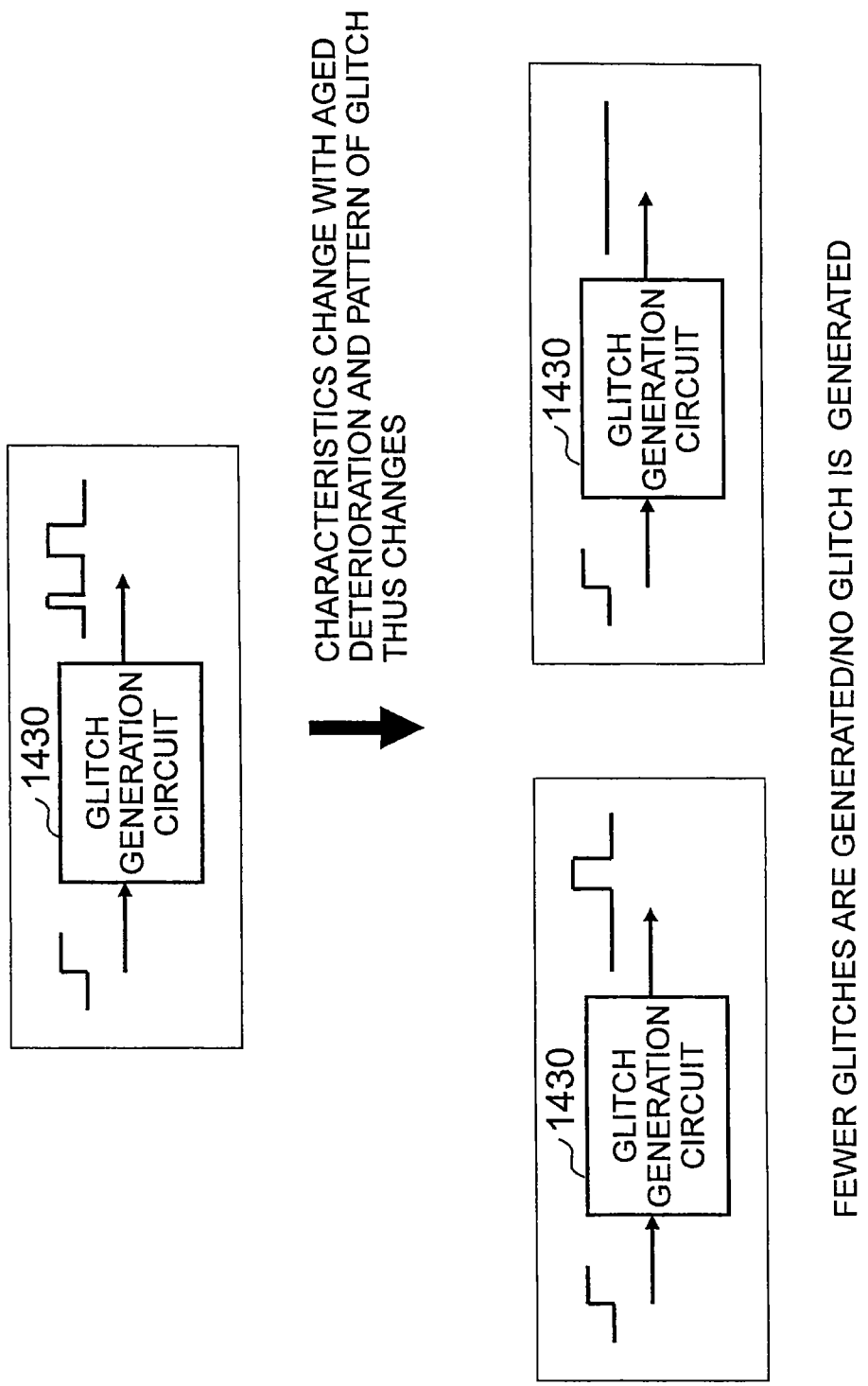

DEVICE SPECIFIC INFORMATION GENERATION DEVICE AND DEVICE SPECIFIC GENERATION METHOD

TECHNICAL FIELD

The present invention relates to security such as authentication and encryption, and more specifically, to a device specific information generation device and a device specific information generation method for generating a device-specific identifier required for authentication, a secret key required for encryption, and the like.

BACKGROUND ART

In semiconductor devices such as ASICs and FPGAs, there is known a phenomenon where, even when the same circuits are mounted on devices of the same type, outputs that differ from one device to another are obtained because of the difference among individual devices in device characteristics such as a gate delay. A circuit that causes such phenomenon or a technology therefor is called "physical unclonable function" or "physical uncloning technology" (in the following description, this technology is referred to as "PUF"), and such technology is expected to be applied to authentication, encryption, and other usages.

As an example of the PUF, there is known a related art that uses a glitch generated in an output signal of a combinational circuit (see, for example, Patent Literature 1). FIG. 13 are a diagram illustrating a basic configuration of a PUF (hereinafter referred to as "glitch PUF") disclosed in Patent Literature 1 and explanatory diagrams of specific signal processing. A glitch PUF 1301 illustrated in FIG. 13(a) includes a data register group 1320, a glitch generation circuit 1330, and a bit conversion circuit 1340.

The glitch as used herein is a phenomenon where the value of a signal is changed repeatedly between 0 and 1 with intensity, which is observed in a transitional state where the value of the signal is changing. A peak generated in a signal waveform is also referred to as "glitch".

In FIG. 13(a), when the value of an input signal 1311 to the glitch generation circuit 1330 formed of the combinational circuit is changed, the value of an output signal 1312 changes accordingly. The glitch is generated in the transitional state, which lasts until the change is completed. A signal including the glitch is hereinafter referred to as "glitch signal".

The glitch changes depending on the characteristics of the individual device on which the glitch generation circuit 1330 is mounted. In other words, even when the same glitch generation circuit 1330 is used, the glitches generated by the respective devices differ from one device to another. In view of this, bits that differ from one device to another can be generated by determining the value of 0 or 1 in accordance with the shape of the glitch. The value may be determined by, for example, the following method. Specifically, in the method, the value is determined as 0 when the number of peaks included in the glitch is an even number and the value is determined as 1 when the number of peaks is an odd number.

FIG. 13(b) illustrates the above-mentioned flow of bit generation processing performed by the glitch PUF 1301. FIG. 13(c) illustrates a mounting example of processing of converting the glitch shape into a bit performed by the bit conversion circuit 1340. FIG. 13(c) illustrates the bit conversion circuit 1340 that uses a toggle flip-flop (hereinafter referred to as "toggle FF") and a timing chart of its operation.

The toggle FF is a circuit in which when a rising signal is input once, an output value is inverted (changed to 0 when being 1 and changed to 0 when being 1). With this principle, whether the number of peaks included in the glitch is an even number or an odd number corresponds to whether the number of times of output inversion is an even number or an odd number on a one-to-one basis, and as a result, corresponds to whether the bit value is 0 or 1 on a one-to-one basis.

Through the series of processing illustrated in FIG. 13, one bit is generated so as to correspond to each input signal 1311. A bit sequence having a plurality of bits can be generated by performing this processing a plurality of times while varying how the input signal 1311 is changed. Specifically, when the input signal to be input to the glitch generation circuit 1330 has n bits, for example, the bit sequence having $2^n-1$ bits can be generated by changing the input signal $2^n-1$ times, that is, $0\rightarrow 1, 0\rightarrow 2, \ldots, 0\rightarrow 2^n-1$.

CITATION LIST

Patent Literature

[PTL 1] WO 11/086,688 A1

SUMMARY OF INVENTION

Technical Problems

However, the configuration of the glitch PUF 1301 disclosed in Patent Literature 1 has the following problems. A performance exhibited when the glitch PUF 1301 is mounted on the device such as a FPGA and an ASIC is not known until the device is actually manufactured. Accordingly, a desired performance may not be satisfied when the device is actually manufactured. The performance in this case is, for example, an amount of information and an error rate.

Moreover, even when a desired performance is satisfied at an initial stage after the device is manufactured, a desired performance may no longer be satisfied over time with the aged deterioration of the device. A description is thus given of why the amount of information decreases because of the aged deterioration of the device. The glitch is generated based on a delay characteristic of a gate constructing the glitch generation circuit 1330. This delay characteristic changes with the aged deterioration of the device, and hence an output pattern of the glitch also changes with the aged deterioration of the device.

FIG. 14 is an explanatory diagram illustrating a state of change with time of the glitch generation circuit in the related-art glitch PUF. As illustrated in FIG. 14, when a glitch generation circuit 1430 changes with time, there occurs a situation where fewer glitches are generated or no glitch is generated. As a result, the generated amount of information decreases. This is because, for example, in the above-mentioned method of determining the bit depending on whether the number of peaks of the glitch is an even number or an odd number, the bit has the value of 0 at all times when no glitch is generated in the first place (the number of peaks is 0).

Not satisfying a desired amount of information or error rate results in a failure to generate an identifier or an encryption key having a desired bit length to cause a problem in that the manufactured device does not function normally.

The present invention has been made in order to solve the problems described above, and has an object to provide a device specific information generation device and a device specific information generation method capable of outputting a glitch satisfying a desired performance without being subjected to an influence at the time of manufacturing a device or an influence of the aged deterioration of the device.

Solution to Problems

According to one embodiment of the present invention, there is provided a device specific information generation device, including a bit generation unit, for generating specific information of a semiconductor device in the semiconductor device, the bit generation unit including: a glitch generation circuit for outputting a glitch generated in an output signal of a combinational circuit; and a bit conversion circuit for converting a shape of the glitch into an information bit. The glitch generation circuit includes a plurality of the combinational circuits mounted thereon to be configured as a top-level glitch generation circuit for outputting a plurality of different glitches. The bit generation unit further includes a selector for receiving a selection signal from outside to select one glitch from among the plurality of different glitches output from the glitch generation circuit, and outputting the selected one glitch to the bit conversion circuit. The device specific information generation device further includes a performance evaluation/control unit for outputting the selection signal so that the one glitch is selected sequentially from among the plurality of different glitches to obtain respective pieces of bit information converted by the bit conversion circuit so as to correspond to the plurality of different glitches, specifying a glitch satisfying a desired performance based on the respective pieces of bit information, and specifying the selection signal so that the specified glitch is output as the specific information of the semiconductor device.

Further, according to another embodiment of the present invention, there is provided a device specific information generation method, which is to be applied to a device specific information generation device, for generating specific information of a semiconductor device in the semiconductor device, the device specific information generation device including: a glitch generation circuit for outputting a glitch generated in an output signal of a combinational circuit; and a bit conversion circuit for converting a shape of the glitch into an information bit. The device specific information generation method includes: outputting a selection signal for selecting one glitch from among a plurality of different glitches output from a plurality of the combinational circuits mounted on the glitch generation circuit to output the selected one glitch to the bit conversion circuit; outputting the selection signal so that the one glitch is selected sequentially from among the plurality of different glitches to obtain respective pieces of bit information converted by the bit conversion circuit so as to correspond to the plurality of different glitches, and specifying a glitch satisfying a desired performance based on the respective pieces of bit information; and specifying the selection signal so that the specified glitch is output as the specific information of the semiconductor device.

Advantageous Effects of Invention

According to the device specific information generation device and the device specific information generation method of one embodiment of the present invention, by mounting the plurality of glitch generation circuits and enabling selection of a glitch generation circuit having a performance close to a desired one from among the plurality of glitch generation circuits, it is possible to provide the device specific information generation device and the device specific information generation method capable of outputting the glitch satisfying a desired performance without being subjected to the influence at the time of manufacturing the device or the influence of the aged deterioration of the device.

BRIEF DESCRIPTION OF DRAWINGS

FIG. 14 is an explanatory diagram illustrating a state of change with time of a glitch generation circuit in a related-art glitch PUF.

DESCRIPTION OF EMBODIMENTS

Now, a description is given of a device specific information generation device and a device specific information generation method according to preferred embodiments of the present invention with reference to the accompanying drawings.

First Embodiment

A basic idea of the present invention is to mount a plurality of circuits having different characteristics as glitch generation circuits. The number of generated glitches is focused on as a characteristic, and a large number of glitch generation circuits including a glitch generation circuit that generates few glitches and a glitch generation circuit that generates many glitches are mounted. For this purpose, in particular, as a basic configuration, simple and small logic circuits are connected in series to increase complexity of logic in a stepwise manner in order to gradually increase the number of glitches to be generated.

Figure 1:
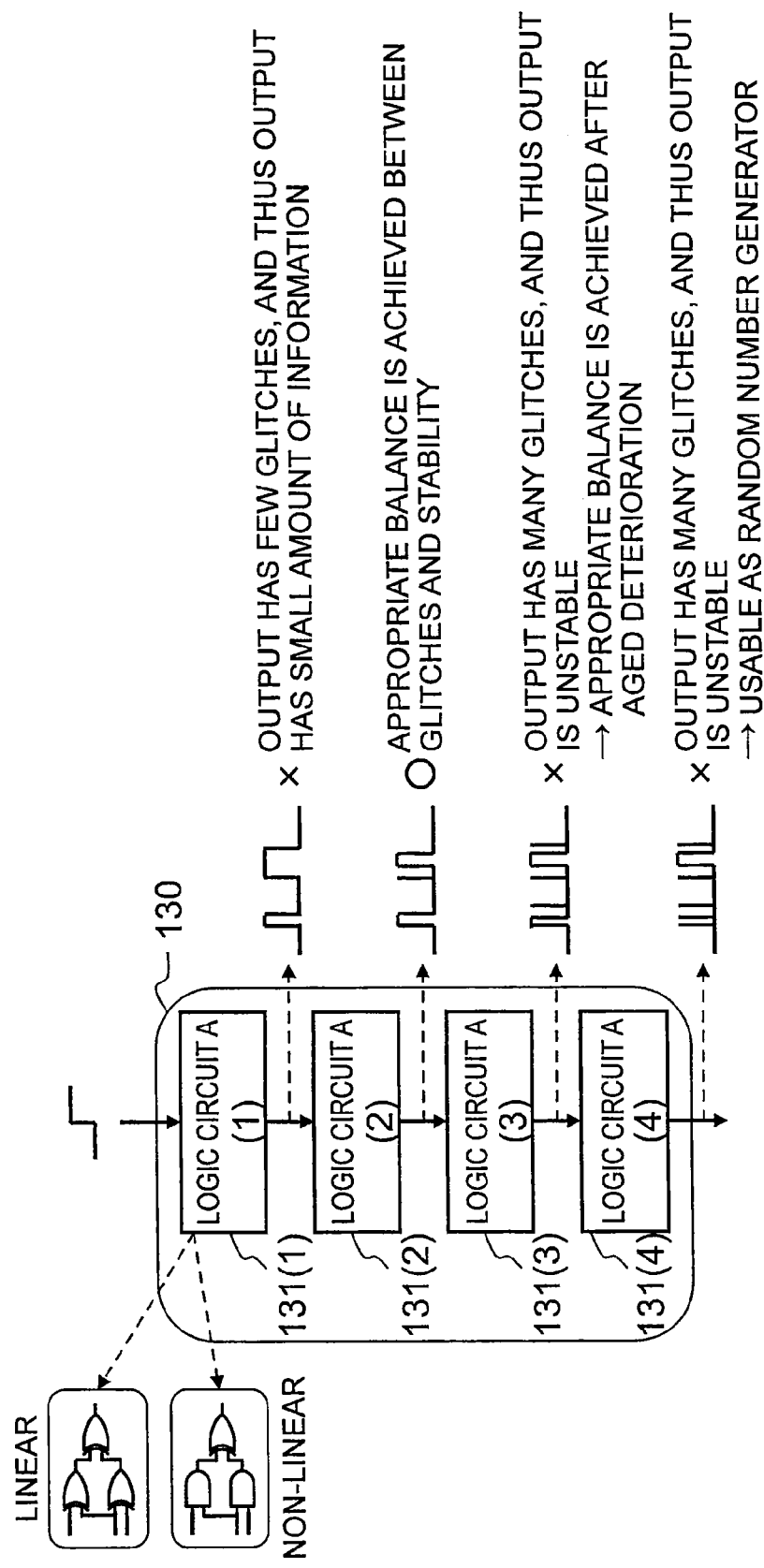
FIG. 1 is a diagram illustrating a basic idea for a glitch generation circuit of a device specific information generation device according to a first embodiment of the present invention.

FIG. 1 is a diagram illustrating the basic idea for a glitch generation circuit of a device specific information generation device according to a first embodiment of the present invention. A glitch generation circuit 130 illustrated in FIG. 1 includes the same four logic circuits A (corresponding to logic circuits 131(1) to 131(4)) that are connected in series. The logic circuit A may be a linear circuit as well as a non-linear circuit.

When the signal input to the glitch generation circuit 130 is changed, glitches are generated in outputs of the respective logic circuits 131(1) to 131(4). Those outputs are outputs of first, second, third, and fourth stages of the glitch generation circuit having the same logic circuits A connected in series, and the logic circuit at a further stage generates more glitches.

With this, for example, the following situation occurs in the example of FIG. 1. Specifically, the output of the logic circuit 131(1) at the first stage has few glitches and a small amount of information. On the other hand, the outputs of the logic circuit 131(3) at the third stage and the logic circuit 131(4) at the fourth stage have many glitches and are unstable. In contrast, the output of the logic circuit 131(2) at the second stage has an appropriate balance between the glitches and the stability.

Figure 2:
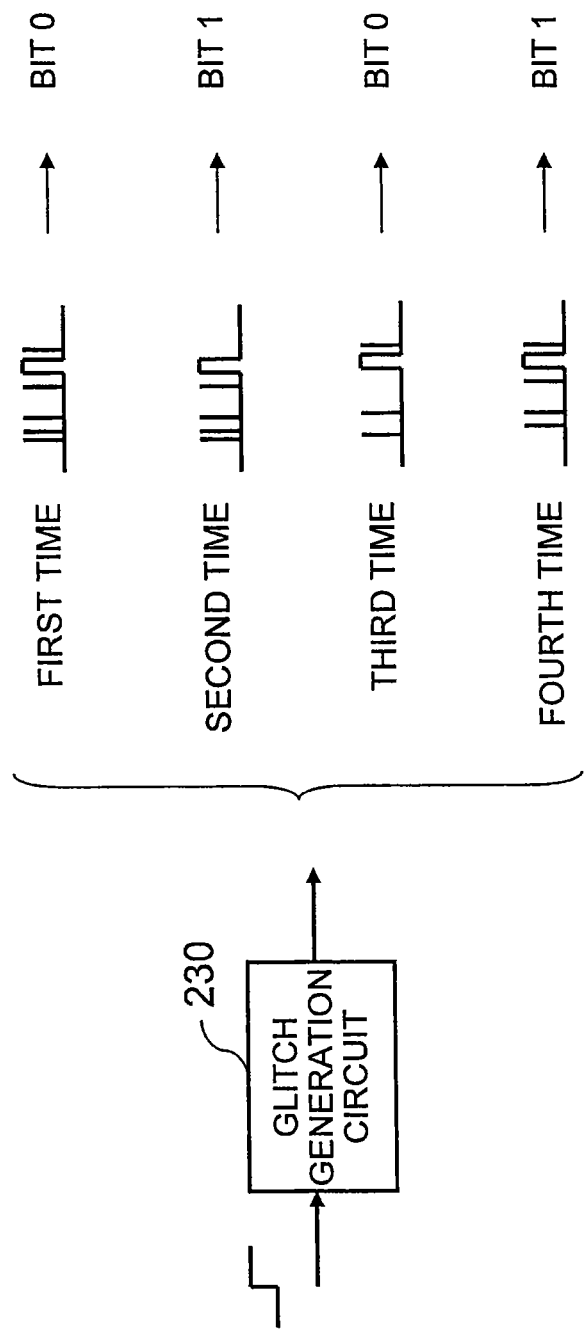
FIG. 2 is an explanatory diagram of stability of a glitch according to the first embodiment of the present invention.

A description is now given of the stability with reference to FIG. 2. FIG. 2 is an explanatory diagram of the stability of the glitch according to the first embodiment of the present invention. Specifically, FIG. 2 illustrates a situation where glitches whose patterns differ from one operation to another are generated in response to the same input signal and the generated bit differs every time. Such situation is referred to as "unstable state". In the unstable state, there is no reproducibility of the bits among the operations, which means that the generated bit cannot be used as information. In other words, the amount of information that can be used as the PUF is reduced.

Referring back to FIG. 1, as more glitches are generated (corresponding to the output of the logic circuit 131(3) at the third stage or the output of the logic circuit 131(4) at the fourth stage), the amount of information becomes larger, but at the same time, the state in which many glitches are generated is unstable. Accordingly, when the stages of the logic circuit A are increased in order to increase the glitches, the amount of information that can be used as the PUF increases at first, but after the increase, the amount of information starts decreasing at some point in time. This is the boundary between the second stage and the third stage. In view of this, in order to achieve both the number of glitches and the stability, in the example illustrated in FIG. 1, the logic circuit 131(2) at the second stage is optimal for the use as the PUF.

In addition, the output of the logic circuit 131(3) at the third stage may be optimal as the PUF after its aged deterioration. In other words, although there are many glitches and the output is thus unstable at a current time, when the logic circuit 131(3) outputs fewer glitches with the aged deterioration, the output of the logic circuit 131(3) at the third stage may be optimal as the PUF.

Moreover, the output of the logic circuit 131(4) at the fourth stage can be used as a random number generator instead of the PUF. In other words, the output of the logic circuit 131(4) at the fourth stage has a significantly large number of glitches, and hence the output changes every time and is thus unstable as illustrated in FIG. 2. Although the output of the logic circuit 131(4) at the fourth stage cannot be thus used as the PUF, the output can be used instead as a random number.

Figure 3:
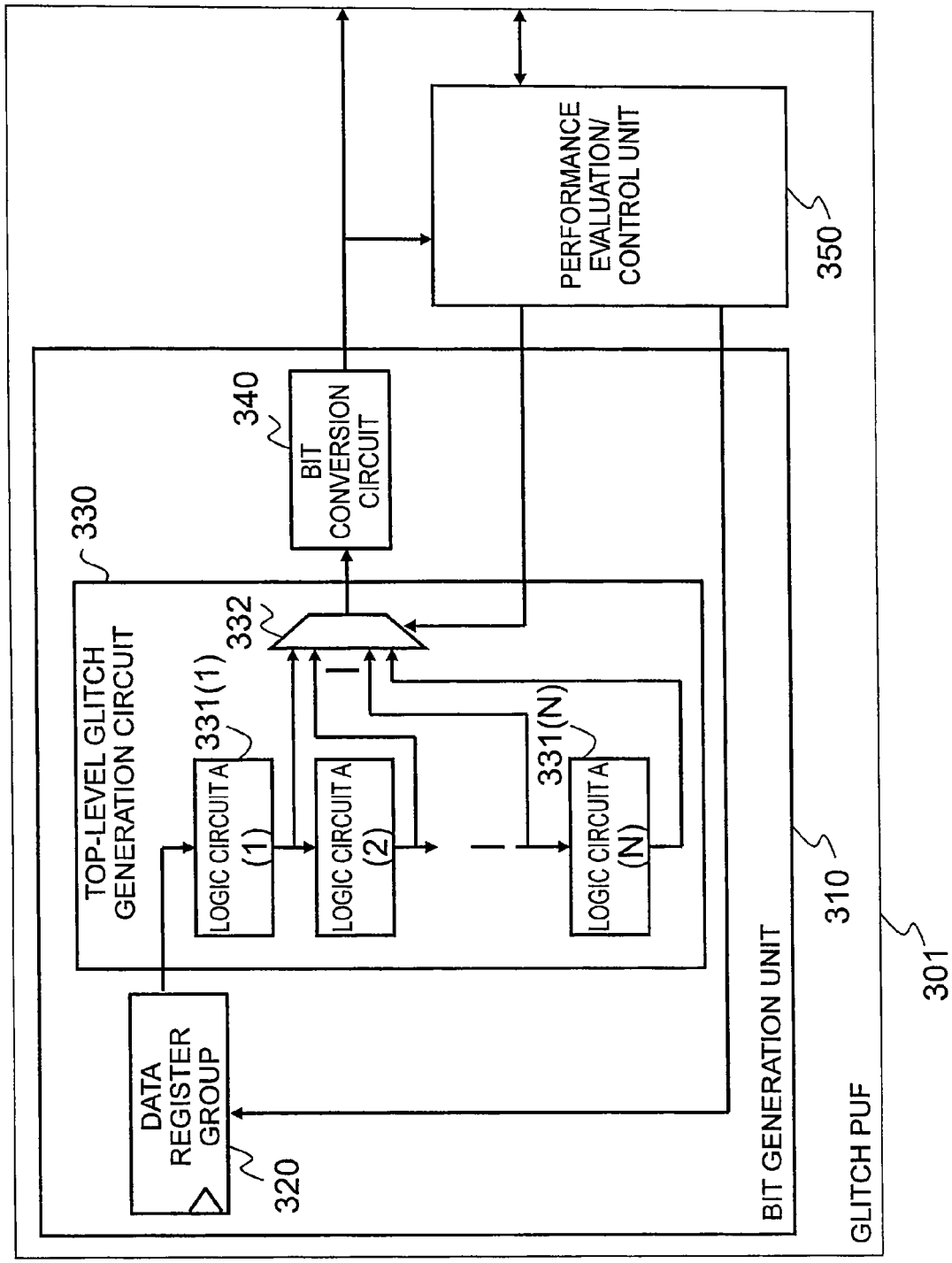
FIG. 3 is a diagram illustrating a first configuration example of the device specific information generation device according to the first embodiment of the present invention.

In view of the principle described above, a description is next given of an internal configuration of the device specific information generation device according to the first embodiment with reference to several illustrated specific examples. FIG. 3 is a diagram illustrating a first configuration example of the device specific information generation device according to the first embodiment of the present invention. A glitch PUF 301 illustrated in FIG. 3, which corresponds to the device specific information generation device, includes a bit generation unit 310 and a performance evaluation/control unit 350.

The bit generation unit 310 has a function of generating bits, and includes a data register group 320, a top-level glitch generation circuit 330, and a bit conversion circuit 340. Meanwhile, the performance evaluation/control unit 350 has a function of evaluating a performance of the bit generated by the bit generation unit 310 and also a function of controlling the bit generation unit 310 so that the bit generation unit 310 generates a glitch having a performance close to a desired one.

A detailed description is given next of an internal configuration of the bit generation unit 310. The data register group 320 of the bit generation unit 310 is a register group for storing data to be input to the top-level glitch generation circuit 330.

The top-level glitch generation circuit 330 includes logic circuits 331(1) to 331(N) including N stages of the same logic circuits A that are connected in series and a selector 332. The operation of the logic circuits 331(1) to 331(N) here is the same as that of the glitch generation circuit 130 including four stages of the logic circuits described above with reference to FIG. 1.

Based on a selection signal output from the performance evaluation/control unit 350, the selector 332 selects one of the outputs of the stages of the logic circuits 331(1) to 331(N) to be supplied to the bit conversion circuit 340 and switches the output to the selected one. With the above-mentioned configuration, the top-level glitch generation circuit 330 has such a configuration as to increase the number of generated glitches in a stepwise manner, and further enables selection of one glitch signal from among N glitch signals based on the selection signal output from the performance evaluation/control unit 350.

Note that, as described above with reference to FIG. 1, the logic circuit A may be the linear circuit as well as the non-linear circuit. As an example of design policy, there is given such a configuration that a simple and small logic circuit is used as each of the logic circuits for the purpose of preventing a size of mounting from increasing and the number of stages N is increased in order to gradually increase the complexity of logic.

Figure 4:
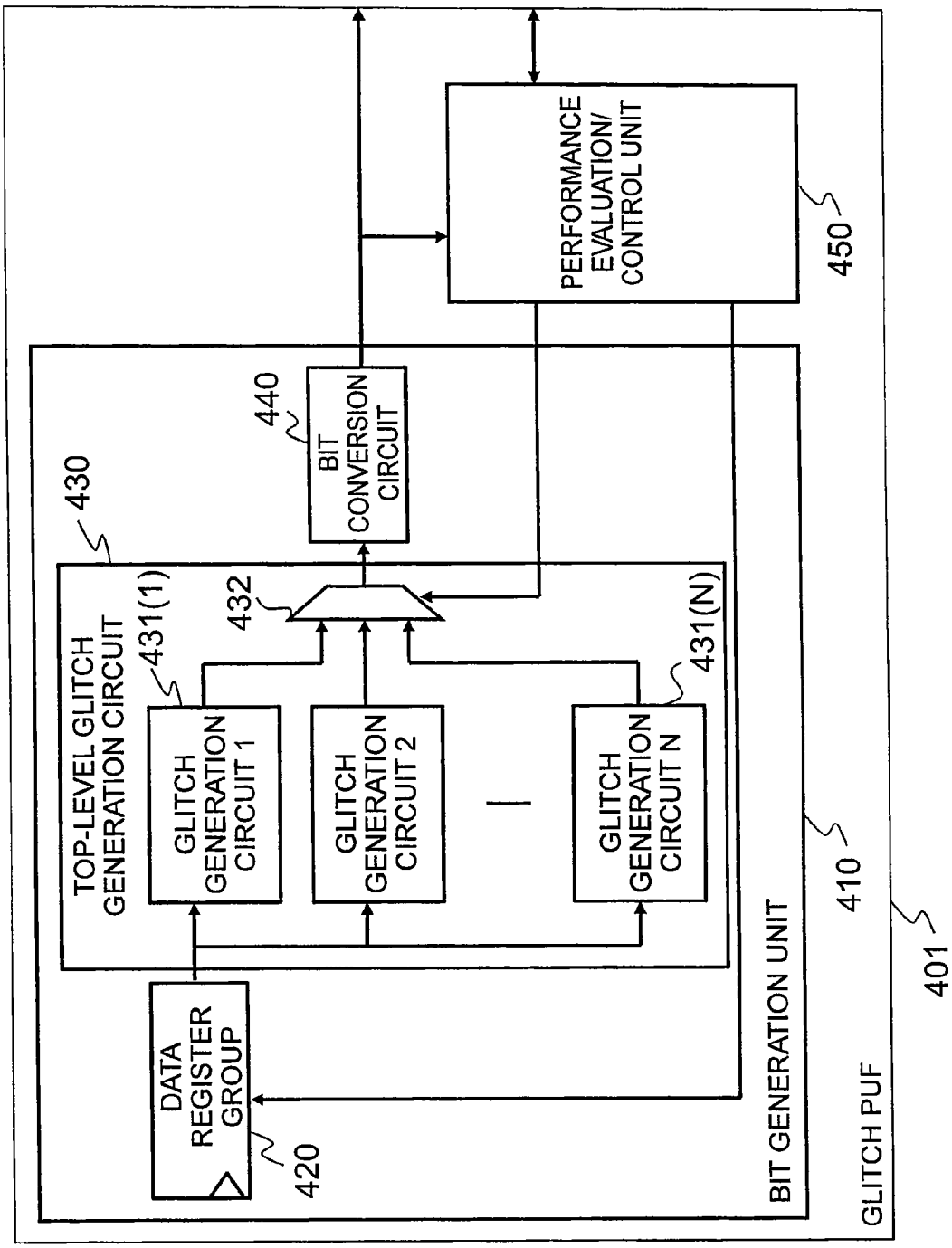
FIG. 4 is a diagram illustrating a second configuration example of the device specific information generation device according to the first embodiment of the present invention.

Next, FIG. 4 is a diagram illustrating a second configuration example of the device specific information generation device according to the first embodiment of the present invention. The glitch PUF 401 illustrated in FIG. 4, which corresponds to the device specific information generation device, includes a bit generation unit 410 and a performance evaluation/control unit 450. The bit generation unit 410 includes a data register group 420, a top-level glitch generation circuit 430, and a bit conversion circuit 440.

When the second configuration example illustrated in FIG. 4 and the above-mentioned first configuration example illustrated in FIG. 3 are compared with each other, those configuration examples have the same basic configurations but are different from each other in the internal configuration of the top-level glitch generation circuit. A description is thus given by focusing mainly on this difference. The top-level glitch generation circuit 330 of the above-mentioned first configuration example illustrated in FIG. 3 generates N glitch signals in total by connecting N stages of the logic circuits A and selecting one from among the outputs of the respective stages.

In contrast, the top-level glitch generation circuit 430 of the second configuration example illustrated in FIG. 4 includes N glitch generation circuits 431(1) to 431(N) that are completely different from one another and a selector 432. In other words, the top-level glitch generation circuit 430 has mounted thereon N glitch generation circuits that are completely different from one another in order to generate N glitch signals.

As an example of the glitch generation circuits 431(1) to 431(N) having the configuration of FIG. 4, there is given an S-box for of an encryption algorithm. S-boxes for various encryption algorithms such as DES, AES, MISTY, and Camellia can be used in order to mount various glitch generation circuits.

A description is given next of the performance evaluation/control unit 350 of FIG. 3 and the performance evaluation/control unit 450 of FIG. 4. Both the performance evaluation/control unit 350 and the performance evaluation/control unit 450 have the same function, and a specific description is given below of the function of the performance evaluation/control unit 350 with reference to FIG. 3.

The performance evaluation/control unit 350 controls the selector 332 so that the selector 332 selects N glitch signals one by one. With this, the bit conversion circuit 340 can convert the glitch signals corresponding to respective stages into bits to generate bits corresponding to the respective stages. The performance evaluation/control unit 350 controls the selector 332 in order to generate bits from a given stage in a repetitive manner (for example, a hundred times), and when controlling the selector 332 in this way, compares, as the outputs of the bit conversion circuit 340, a value obtained at the first time with values obtained at second and subsequent times. The performance evaluation/control unit 350 can evaluate an error rate in this manner.

Figure 5:
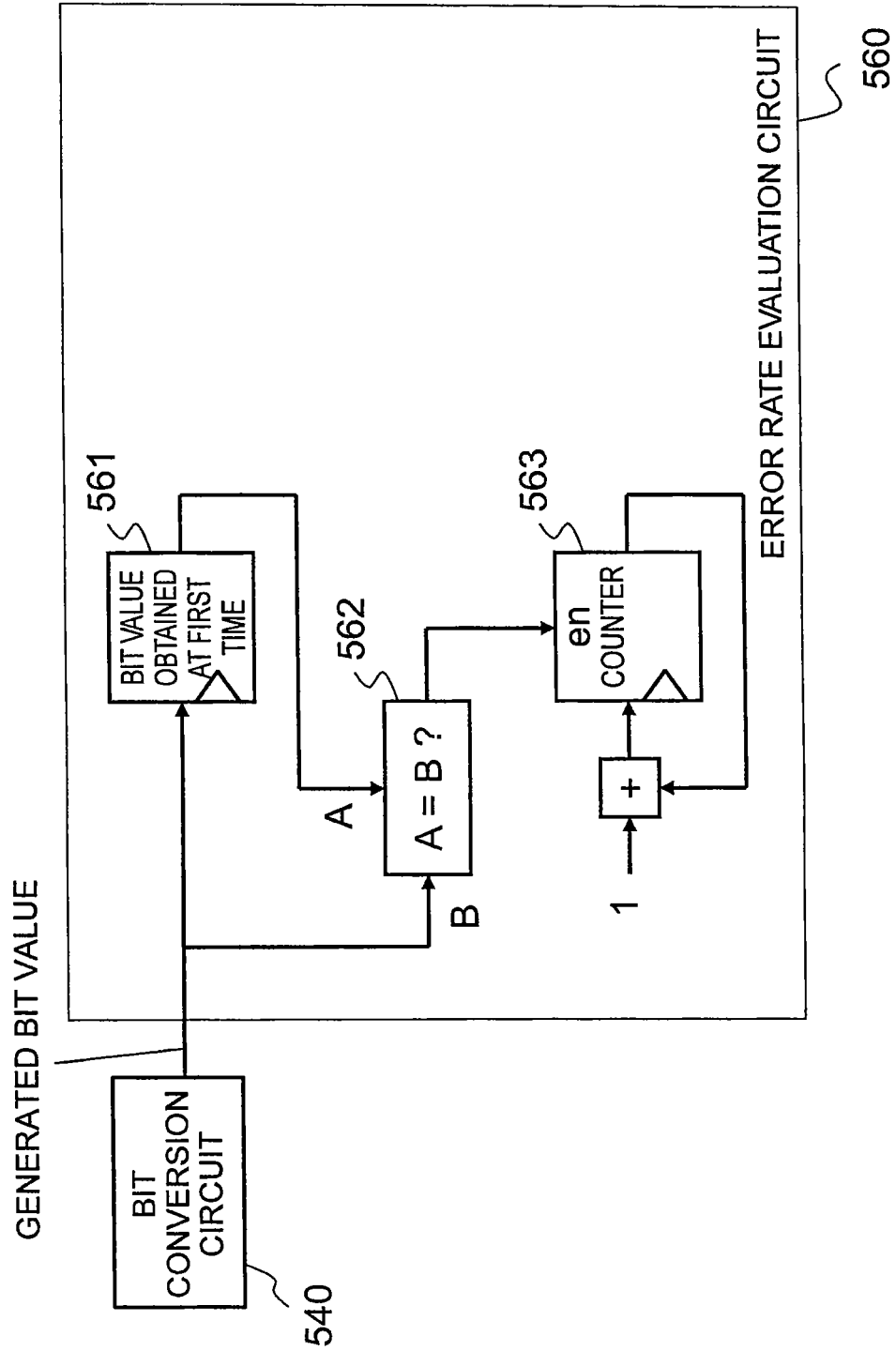
FIG. 5 is a diagram illustrating a configuration example of an error rate evaluation circuit included in a performance evaluation/control unit according to the first embodiment of the present invention.

FIG. 5 is a diagram illustrating a configuration example of an error rate evaluation circuit included in the performance evaluation/control unit according to the first embodiment of the present invention. An error rate evaluation circuit 560 includes a register 561 for retaining a bit value obtained at the first time, a comparator 562 for comparing the bit value obtained at the first time with the bit values obtained at the second and subsequent times, and a register 563 for counting the number of times for which the comparison result indicates that two values are not identical to retain the count number of times.

Whew the comparison result indicates that two values are not identical, the comparator 562 generates an enable signal for the register 563. The register 563 can count the number of times for which two values are not identical by incrementing the value of the register by one in response to the enable signal. For example, when the value of the register 563 is ten after the comparison has been is performed a hundred times, the error rate evaluation circuit 560 determines that the error rate is 10%.

As described above, the error rate can be evaluated by repeating generation of the bit by the same device a hundred times, for example, and using the generated hundred bit values. On the other hand, in order to evaluate the amount of information, the hundred bit values generated for a plurality of, for example, a hundred different devices are required. It is therefore necessary to create a situation where a plurality of devices exist in the same device in a simulated manner.

Figure 6:
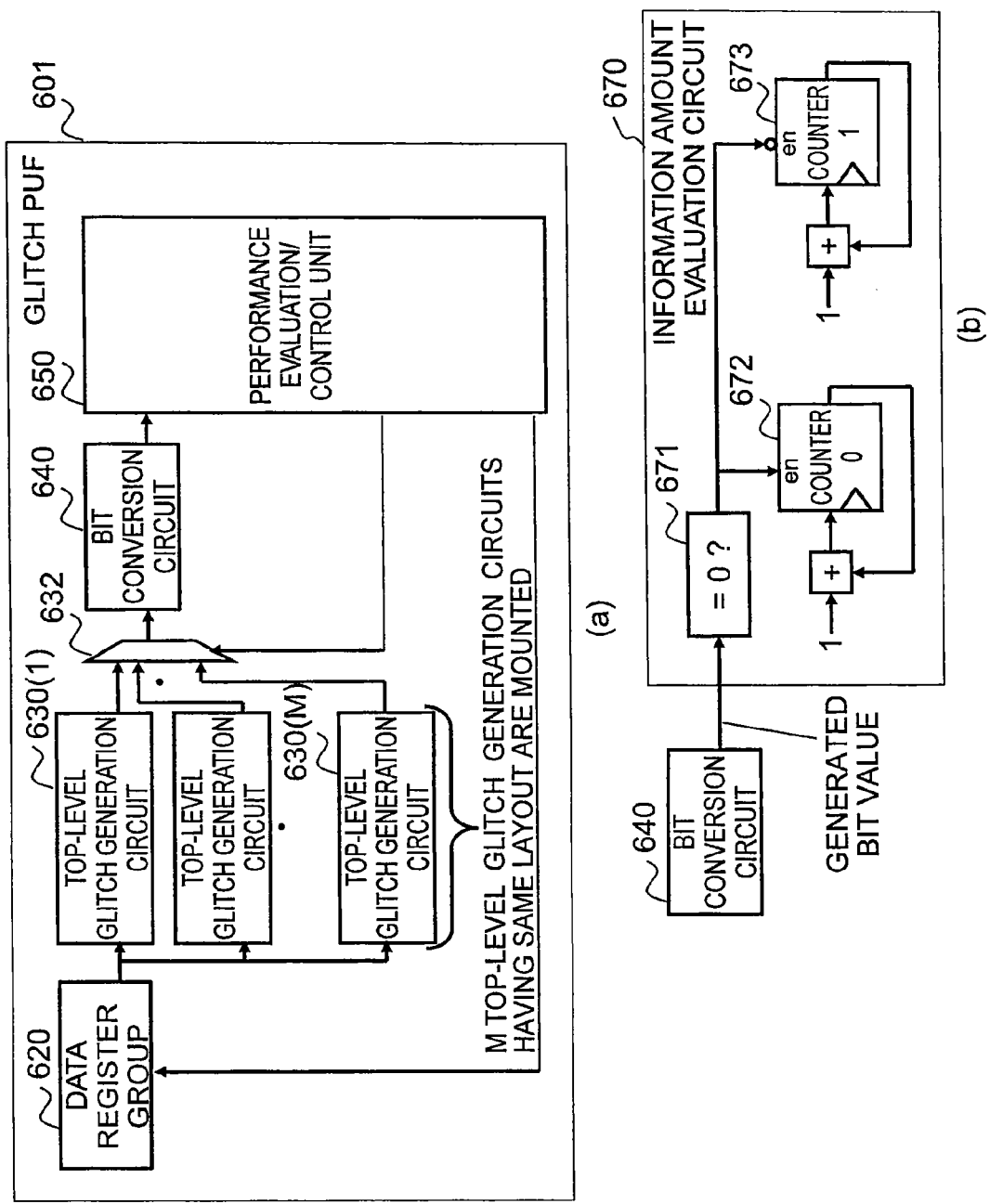
FIG. 6 are a diagram illustrating a configuration example of a device specific information generation device for evaluating an amount of information according to the first embodiment of the present invention and a diagram illustrating a configuration example of an information amount evaluation circuit included in a performance evaluation/control unit according to the first embodiment of the present invention.

FIG. 6 are a diagram illustrating a configuration example of the device specific information generation device for evaluating the amount of information according to the first embodiment of the present invention and a diagram illustrating a configuration example of an information amount evaluation circuit included in a performance evaluation/control unit according to the first embodiment of the present invention. A glitch PUF 601 illustrated in FIG. 6(a), which corresponds to the device specific information generation device, includes a data register group 620, M top-level glitch generation circuits 630(1) to 630(M), a selector 632, a bit conversion circuit 640, and a performance evaluation/control unit 650.

The data register group 620, the selector 632, the bit conversion circuit 640, and the performance evaluation/control unit 650 have the same functions as those of the above-mentioned data register group 320, selector 332, bit conversion circuit 340, and performance evaluation/control unit 350, respectively, which are illustrated in FIG. 3.

The M top-level glitch generation circuits 630(1) to 630(M) are formed by mounting M top-level glitch generation circuits each corresponding to the above-mentioned top-level glitch generation circuit 330 of FIG. 3 or the above-mentioned top-level glitch generation circuit 430 of FIG. 4 (that is, one having N glitch generation circuits in order to generate N glitch signals) on the device with the same layout.

The performance evaluation/control unit 650 controls the selector 632 to enable selection of one output from among outputs of the M top-level glitch generation circuits 630(1) to 630(M). With this, the glitch PUF 601 serves as the glitch PUFs for M devices in a simulated manner to generate bits for M devices in a simulated manner. The glitch PUF 601 can evaluate the amount of information by controlling the performance evaluation/control unit 650 to perform statistical processing on M bit values generated in a simulated manner.

The amount of information of a given bit is measured based on, for example, Shannon entropy. The Shannon entropy is defined as follows:

$$-p \times \log 2(p) - (1-p) \times \log 2(1-p) \quad (1)$$

where p represents a probability of the bit being 0 (1-p is a probability of the bit being 1). Note that, "log 2" is a logarithmic function having a base of 2.

It is desired that the amount of information be evaluated with use only of the value of p because the size of mounting is increased when the logarithmic function is implemented as a circuit. Expression (1) given above is a symmetric convex function that takes the maximum value when p=0.5, and hence whether the amount of information is roughly large or small can be determined with use of the value of p. In view of this, referring to FIG. 6(b), a description is given of a function of an information amount evaluation circuit 670 included in the performance evaluation/control unit 650.

The information amount evaluation circuit 670 illustrated in FIG. 6(b) includes a comparator 671 and two registers 672 and 673. The comparator 671 determines whether or not the bit value generated by the bit conversion circuit 640 is 0, and generates enable signals for the register 672 and the register 673 based on the result of determination.

One of enable signals for the two registers 672 and 673 is inversion of the other. The register 672 functions as a counter whose value is incremented when the bit value is 0, and the register 673 functions as a counter whose value is incremented when the bit value is 1. With the use of the information amount evaluation circuit 670 on the above-mentioned M bit values generated by the glitch PUF 601 as the performance evaluation/control unit 650, the number of 0s and the number of 1s in M bits can be calculated. As a result, it is possible to evaluate the amount of information.

This circuit can also be used for the purpose of evaluating a frequency of 0/1 of the bit or the like in the random number test that is defined in the NIST SP800-22 published in the U.S.

Figure 7:
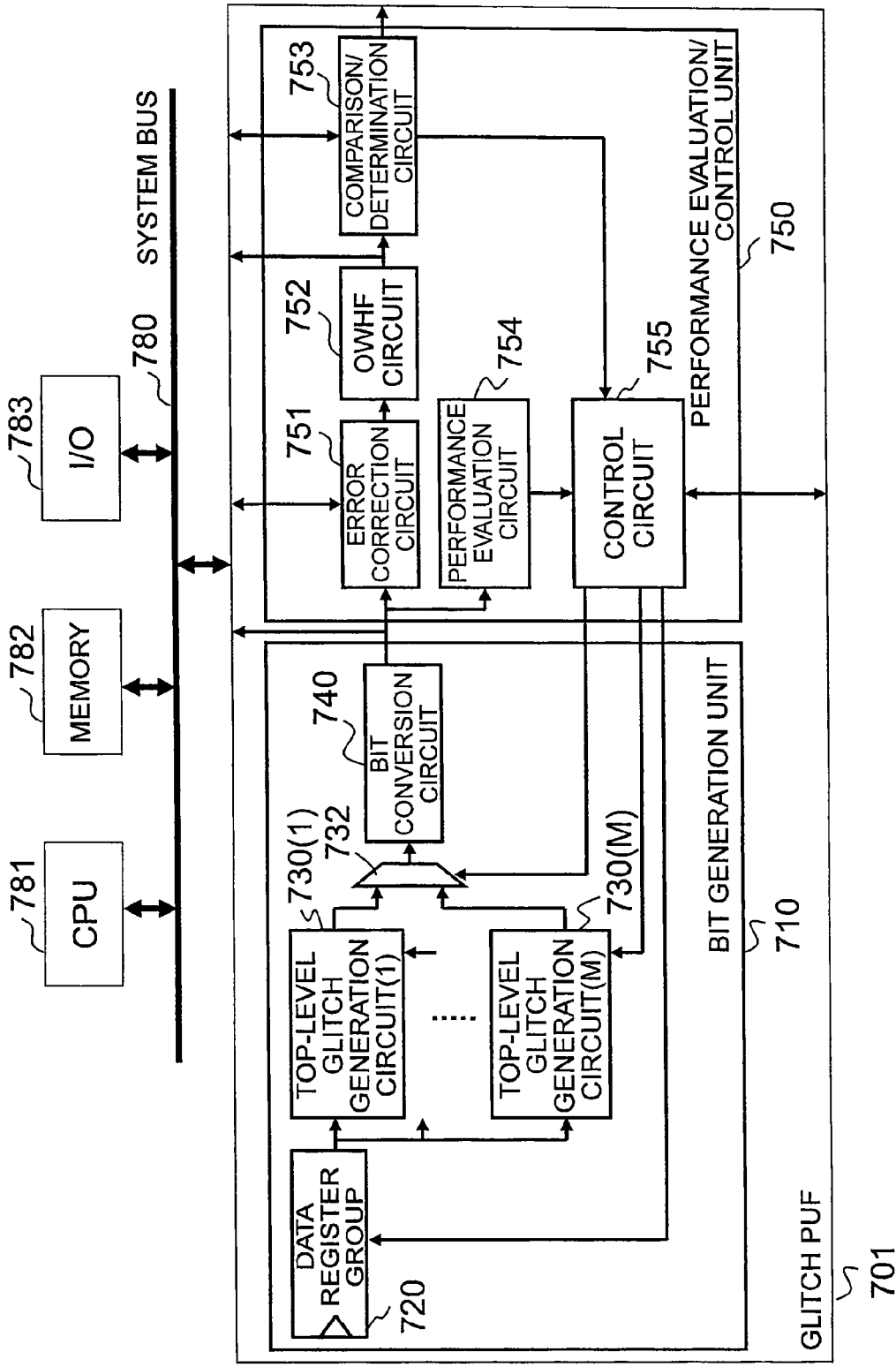
FIG. 7 is a diagram illustrating a configuration example of a system including the device specific information generation device according to the first embodiment of the present invention.

Next, a description is given of an example in which the bit generation unit and performance evaluation/control unit described above are configured as a system including a CPU and a memory as well. FIG. 7 is a diagram illustrating a configuration example of the system including the device specific information generation device according to the first embodiment of the present invention. A glitch PUF 701 illustrated in FIG. 7, which corresponds to the device specific information generation device, includes a bit generation unit 710 and a performance evaluation/control unit 750.

The bit generation unit 710 includes a data register group 720, M top-level glitch generation circuits 730(1) to 730(M), a selector 732, and a bit conversion circuit 740. In the same manner as in FIG. 6(a), the bit generation unit 710 includes the M top-level glitch generation circuits 730(1) to 730(M) that are mounted on the device with the same layout. A bit sequence generated by the bit generation unit 710 is input to the performance evaluation/control unit 750.

The performance evaluation/control unit 750 includes an error correction circuit 751, an OWHF circuit 752, a comparison/determination circuit 753, a performance evaluation circuit 754, and a control circuit 755. The error correction circuit 751 is a circuit for correcting an error contained in the bit sequence input to the performance evaluation/control unit 750. The OWHF circuit 752 is a circuit for obtaining a hash value of the bit sequence whose error has been corrected.

The comparison/determination circuit 753 is a circuit for comparing the generated hash value with a hash value generated previously. The performance evaluation circuit 754 is a circuit for evaluating a performance of the bit sequence input to the performance evaluation/control unit 750. The control circuit 755 is a circuit for controlling the bit generation unit 710 based on the result of determination obtained by the comparison/determination circuit 753 and the result of evaluation obtained by the performance evaluation circuit 754.

In addition, the glitch PUF 701 illustrated in FIG. 7 is connected via a system bus 780 to a CPU 781, a memory 782, and an I/O 783.

Figure 8:
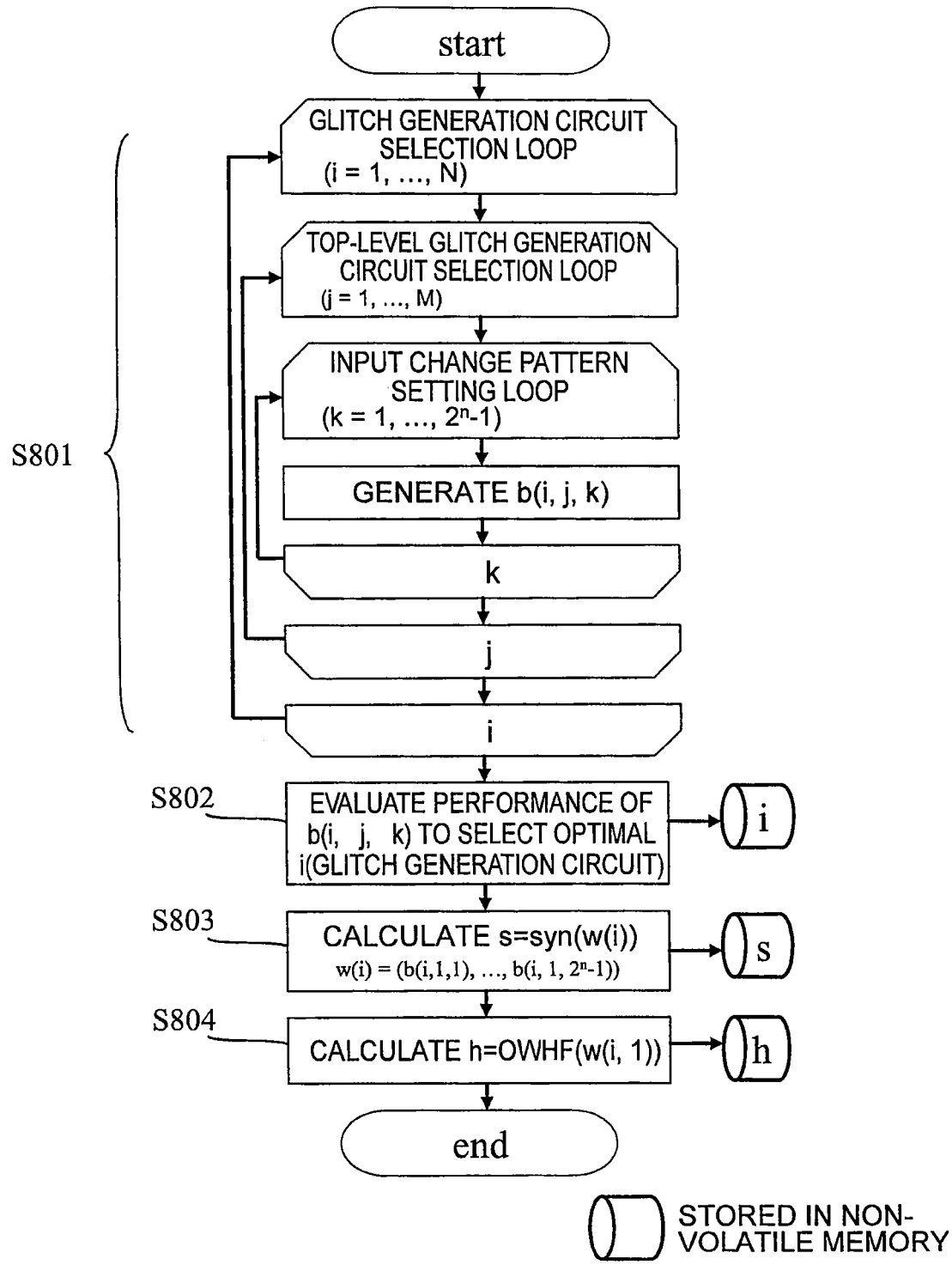
FIG. 8 is a flowchart of initial settings made by a glitch PUF illustrated in FIG. 7 according to the first embodiment of the present invention.
Figure 9:
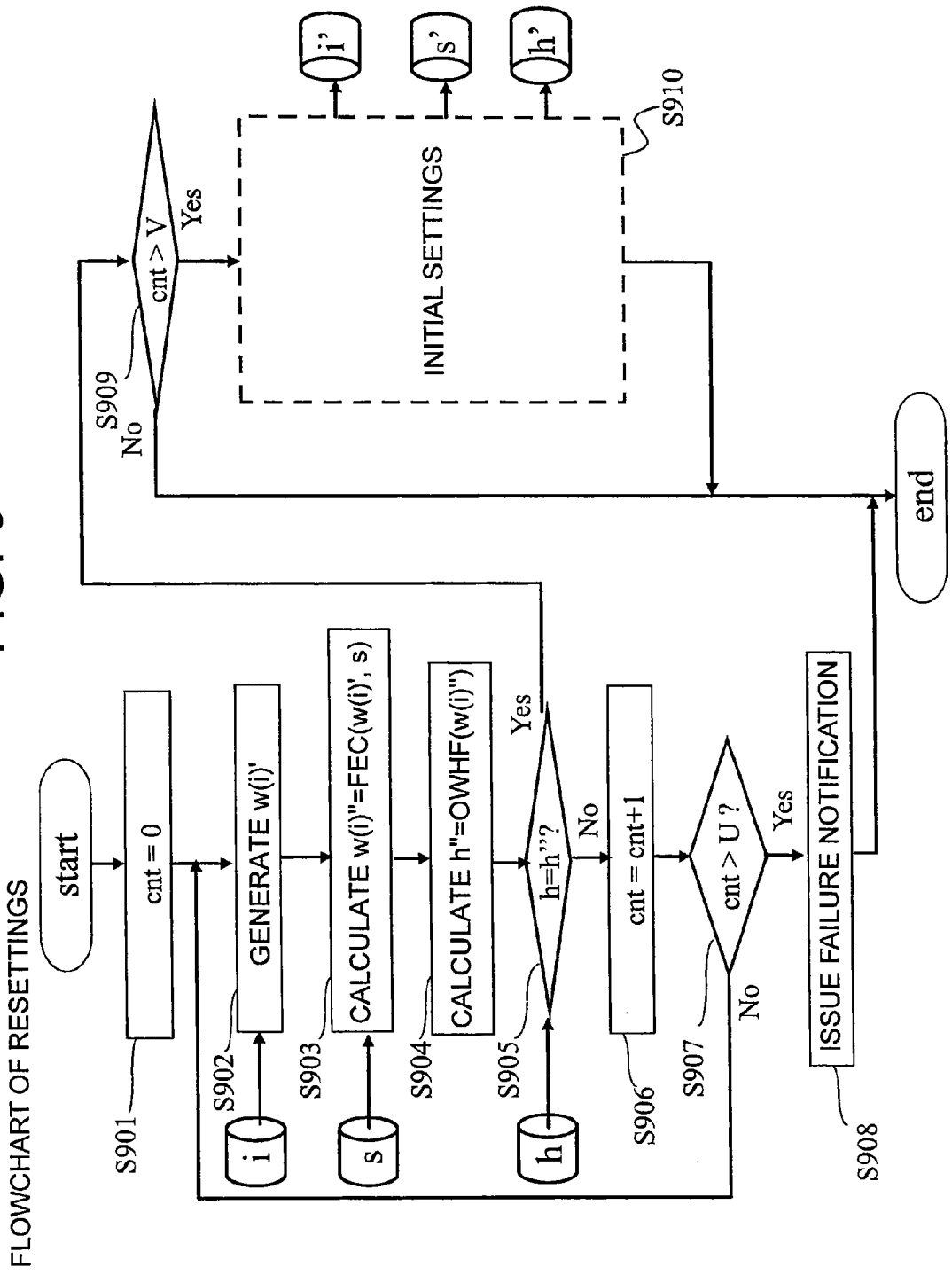
FIG. 9 is a flowchart of resettings made by the glitch PUF illustrated in FIG. 7 according to the first embodiment of the present invention.

Next, a detailed description is given of an operation of the glitch PUF 701 having the configuration of FIG. 7 with reference to a flowchart. FIG. 8 is a flowchart of initial settings made by the glitch PUF 701 illustrated in FIG. 7 according to the first embodiment of the present invention. Moreover, FIG. 9 is a flowchart of resettings made by the glitch PUF 701 illustrated in FIG. 7 according to the first embodiment of the present invention.

First, with reference to FIG. 8, a description is given of a series of processing steps of the initial settings step by step.

Step S801: a step of obtaining, by the control circuit 755, a bit $b(1, 1, 1)$ to a bit $b(N, M, 2^n-1)$. A first index i of $b(i, j, k)$ is a number of the glitch generation circuit ($i=1, \ldots, N$). In other words, in FIG. 3, the index i corresponds to a number for selecting any one of the logic circuits 331(1) to 331(N) and in FIG. 4, a number for selecting any one of the glitch generation circuits 431(1) to 431(N).

A second index j corresponds to a number for selecting any one of the M top-level glitch generation circuits 730(1) to 730(M) mounted with the same layout ($j=1, \ldots, M$). A third index k is a number representing a change pattern of an input to the glitch generation circuit, and corresponds to the bit sequence having $2^n-1$ bits when the input signal has n bits.

Step S802: a step of evaluating, by the performance evaluation circuit 754, the performances of the bits $b(1, 1, 1), \ldots, b(N, M, 2^n-1)$. Based on the result of evaluation, the performance evaluation circuit 754 selects the index i ($i=1, \ldots, N$) satisfying a desired performance, and retains the index i in the memory 782.

Note that, the index j is an index representing the device obtained by mounting M devices in a simulated manner in order to evaluate the amount of information, and hence after the evaluation, only one value needs to be actually used as j. In the following description, it is assumed that $j=1$ is used.

Step S803: a step of generating, by the error correction circuit 751, a syndrome s required for correcting an error of a bit sequence $w(i)=(b(i, 1, 1), \ldots, b(i, 1, 2^n-1))$ corresponding to the index i satisfying a desired performance when it is assumed that $j=1$, and retaining the generated syndrome s in the memory 782.

Step S804: a step of calculating, by the OWHF circuit 752, a hash value h of the bit sequence $w(i)$ to retain the calculated hash value h in the memory 782.

The flowchart of the initial settings has now been described. Through the above-mentioned series of processing steps, the performance evaluation/control unit 750 can make initial settings of the index i satisfying a desired performance, the syndrome s required for correcting an error of the bit sequence $w(i)$, and the hash value h of the bit sequence $w(i)$.

Next, with reference to FIG. 9, a description is given of a series of processing steps of resettings step by step.

Step S901: a step of initializing, by the control circuit 755, the value of a counter cnt with 0. The counter cnt represents a count of failures of the error correction in Step S903.

Step S902: a step of controlling, by the control circuit 755, the bit generation unit 710 to generate a bit sequence $w(i)'$ corresponding to the index i determined in the above-mentioned initial settings. The control circuit 755 reads out the index i from the memory 782. The control circuit 755 then generates the selection signal for selecting the glitch generation circuit i and the selection signal is input to the selector of the top-level glitch generation circuit 730(1) at a first stage (corresponding to $j=1$). The bit sequence $w(i)'$ can be generated in this manner. Note that, the symbol "'" is added to the bit sequence $w(i)'$ because the bit sequence $w(i)'$ usually contains an error and thus has a value different from $w(i)$ generated in the initial settings.

Step S903: a step of performing, by the error correction circuit 751, error correction processing on the bit sequence $w(i)'$ to obtain a bit sequence $w(i)''$. The error correction circuit 751 reads out the syndrome s for error correction generated in the initial settings from the memory 782 to perform error correction processing on the bit sequence $w(i)'$. It is expected that the bit sequence $w(i)''$ after the error correction is identical with the bit sequence $w(i)$ generated in the initial settings.

Step S904: a step of calculating, by the OWHF circuit 752, a hash value $h''$ of the bit sequence $w(i)''$.

Step S905: a step of comparing, by the comparison/determination circuit 753, the hash value $h''$ with the hash value h generated in the initial settings to branch the processing depending on the result of comparison. When a relationship of $h=h''$ is satisfied, this means that the error correction performed in Step S903 results in success and the bit sequence $w(i)$ generated in the initial settings can be regenerated. On the other hand, when a relationship of $h \neq h''$ is satisfied, the error correction performed in Step S903 results in failure and the bit sequence $w(i)$ generated in the initial settings cannot be regenerated.

Step S906: a step of incrementing, by the control circuit 755, the value of the counter cnt representing the count of failures in the error correction by 1 when the relationship of h≠h" is satisfied in Step S905 to proceed to next Step S907.

Step S907: a step of determining, by the control circuit 755, whether or not the value of the counter cnt exceeds a predetermined threshold value U. When the counter cnt does not exceed U, the processing returns to Step S902 and the control circuit 755 again generates the bit sequence and performs the error correction.

Step S908: a step of issuing, by the control circuit 755, a failure notification when the relationship of cnt>U is satisfied in Step S907. This means that the control circuit 755 determines that the bit sequence w(i) cannot be regenerated even if the bit sequence generation and the error correction are continued further.

Step S909: a step of determining, by the control circuit 755, when the hash value satisfies the relationship of h=h" in Step S905 and the regeneration of the bit sequence w(i) thus results in success, whether or not the value of the counter cnt exceeds a given threshold value V. When cnt does not exceed V, the control circuit 755 ends the resettings processing. Note that, a relationship between U and V satisfies U>V.

Step S910: a step of performing, by the performance evaluation/control unit 750, the processing of the initial settings to select a new index i' when the relationship of cnt>V is satisfied in Step S909. This means that the performance evaluation/control unit 750 determines that the circuit characteristics have changed significantly because the regeneration of the bit sequence w(i) has resulted in failure over and over again and makes the initial settings again before the bit sequence w(i) cannot be regenerated any longer to select the new i' again.

The flowchart of the resettings has now been described. Through the above-mentioned series of processing steps, the performance evaluation/control unit 750 can ensure that the glitch satisfying a desired performance (such as the amount of information and the error rate) is output without being influenced by the device manufacture or the aged deterioration of the device and can make the initial settings again as the need arises.

As described above, according to the first embodiment, the plurality of glitch generation circuits are mounted so that the amounts of information of those circuits can be evaluated. It is therefore possible to increase a possibility that the glitch satisfies a desired performance by enabling selection of the glitch generation circuit to be used from among the plurality of glitch generation circuits. It is also possible to select the glitch generation circuit that actually satisfies a desired performance by including the performance evaluation/control unit.

In addition, those features ensure that the glitch PUF satisfies a desired amount of information at the time of manufacturing the device and after the aged deterioration of the device. As a result, for example, it is possible to ensure that a function of a manufactured device that uses the glitch PUF operates normally or to further lengthen a warranty period of the function.

Moreover, the plurality of glitch generation circuits, in particular, the glitch generation circuit that generates the glitch frequently and thus the generated bit may vary every time (has low reproducibility) is mounted and a frequency of 0/1 of the generated bit or the like can be evaluated, and hence the glitch PUF can be used as the random number generator.

Second Embodiment

In the first embodiment described above, the description has been given of the initial settings of selecting the optimal glitch generation circuit and the resettings to be made when the characteristics of the glitch generation circuit are changed. In addition to this, in a second embodiment of the present invention, a description is given of a specific application example of using the glitch generation circuit.

Figure 10:
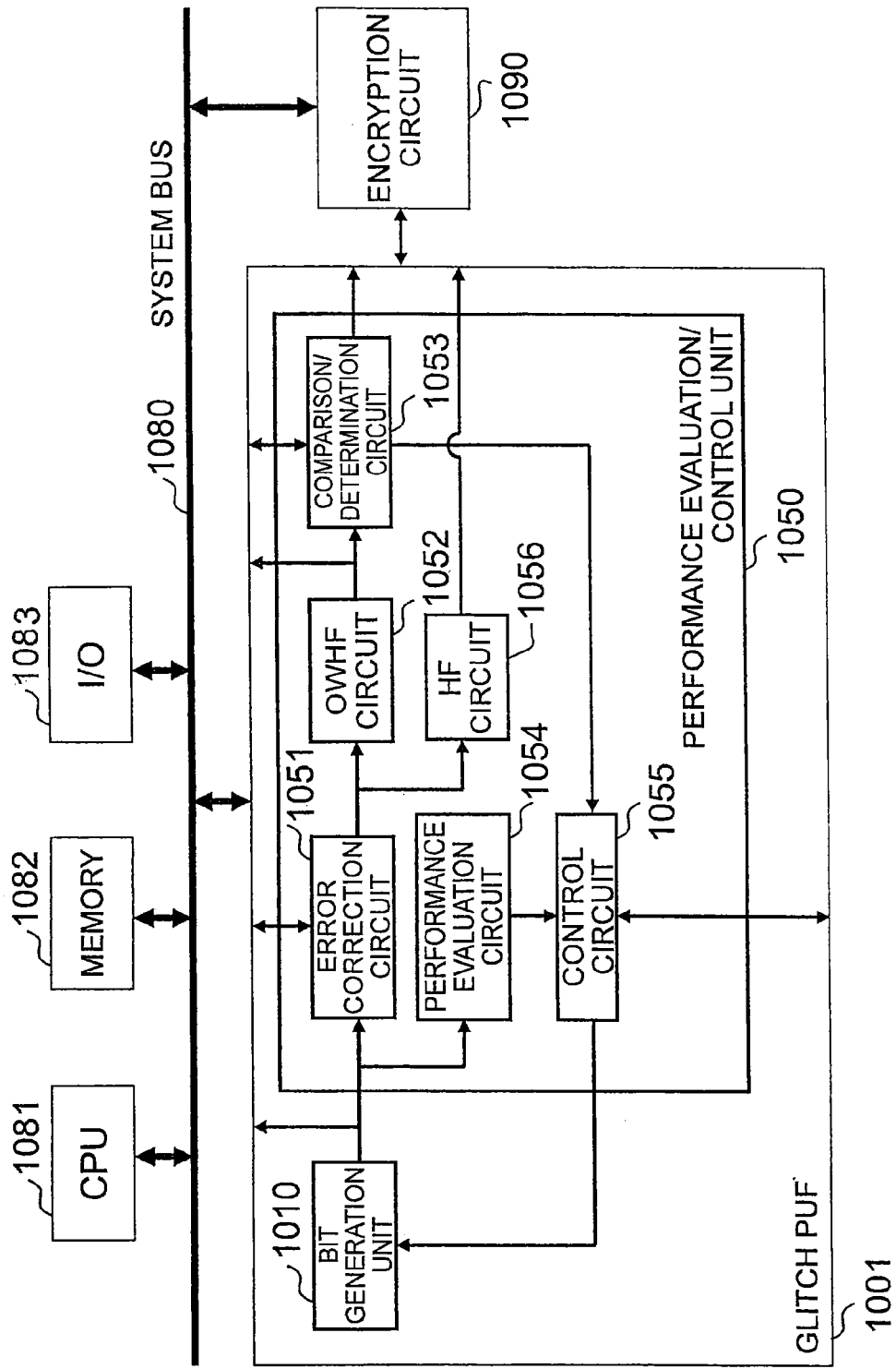
FIG. 10 is a configuration diagram of a performance evaluation/control unit in a case of generating a key according to a second embodiment of the present invention.

The generation of the bit sequence by the glitch PUF can be used to generate a key to be used for an encryption algorithm. FIG. 10 is a configuration diagram of a performance evaluation/control unit according to the second embodiment of the present invention in a case of generating the key. A performance evaluation/control unit 1050 according to the second embodiment includes an error correction circuit 1051, an OWHF circuit 1052, a comparison/determination circuit 1053, a performance evaluation circuit 1054, a control circuit 1055, and an HF circuit 1056. The configuration of FIG. 10 according to the second embodiment further includes an encryption circuit 1090.

As compared with the configuration of FIG. 7 according to the first embodiment described above, the performance evaluation/control unit 1050 of FIG. 10 according to the second embodiment is different in further including a hash function (HF circuit 1056) for randomizing the bit sequence. The operation of the HF circuit 1056 enables the bit sequence generated by a glitch PUF 1001 to be used as the key for the encryption algorithm.

Figure 11:
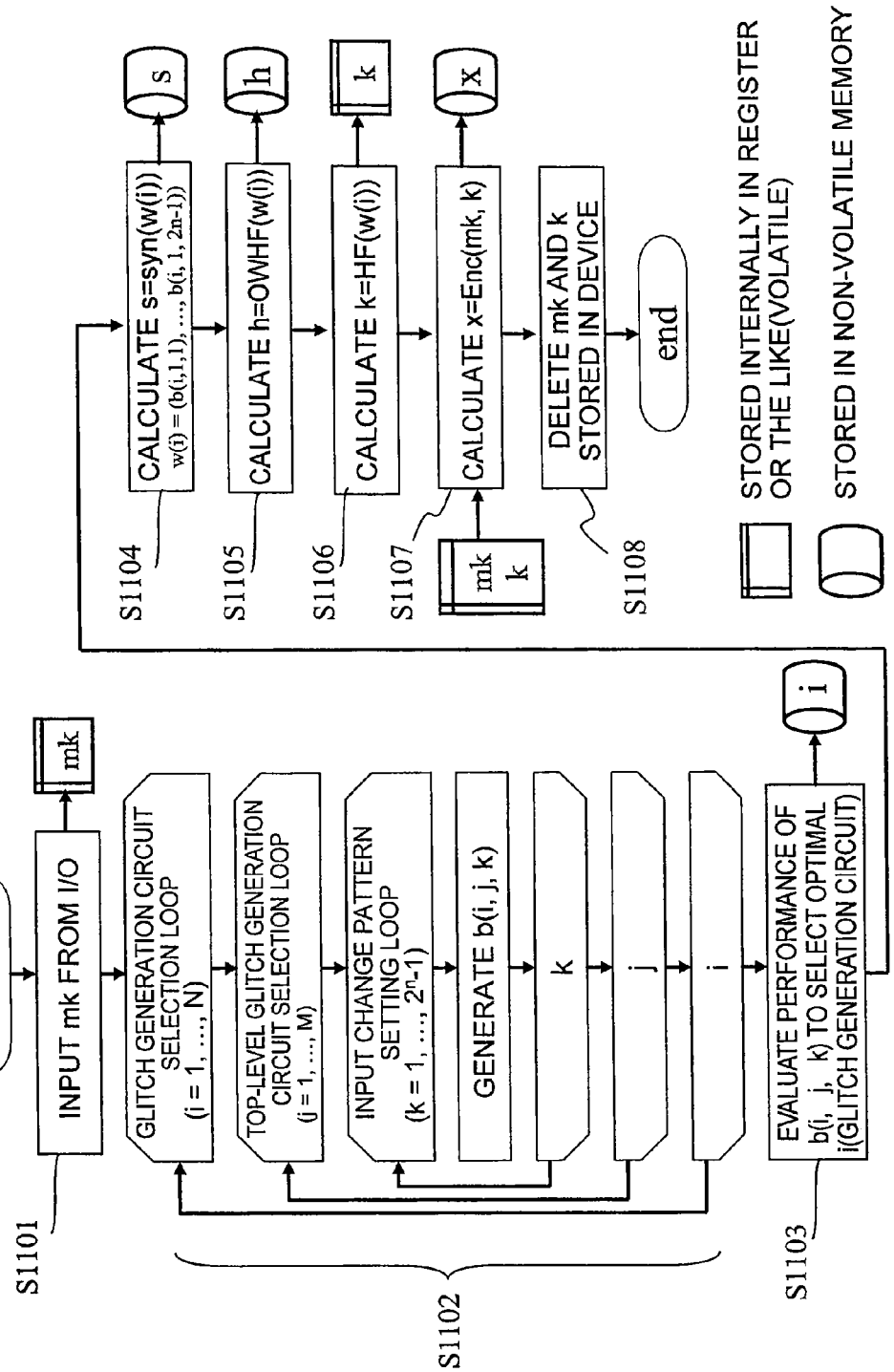
FIG. 11 is a flowchart of initial settings made by a glitch PUF illustrated in FIG. 10 according to the second embodiment of the present invention.
Figure 12:
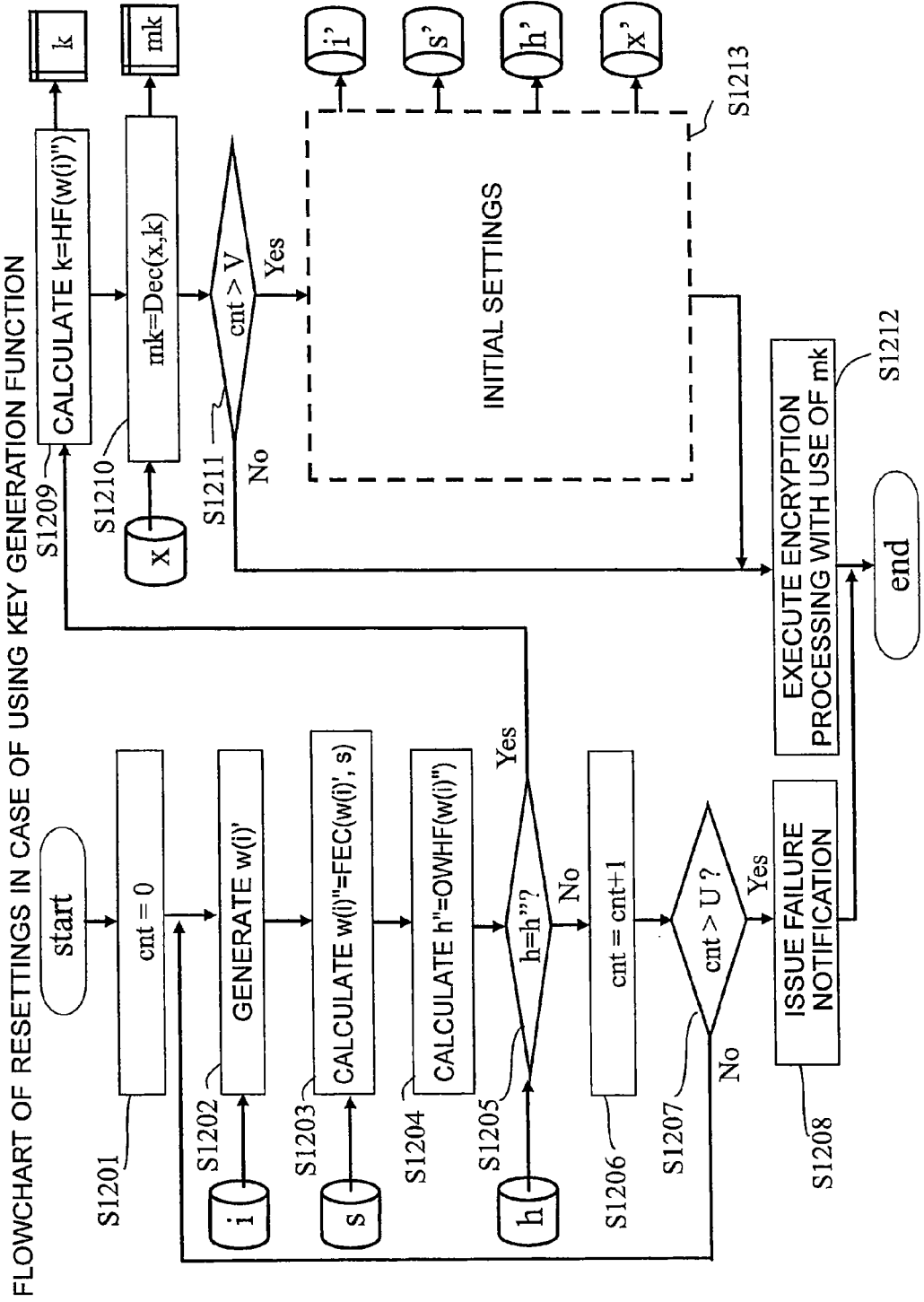
FIG. 12 is a flowchart of resettings made by the glitch PUF illustrated in FIG. 10 according to the second embodiment of the present invention.
Figure 13:
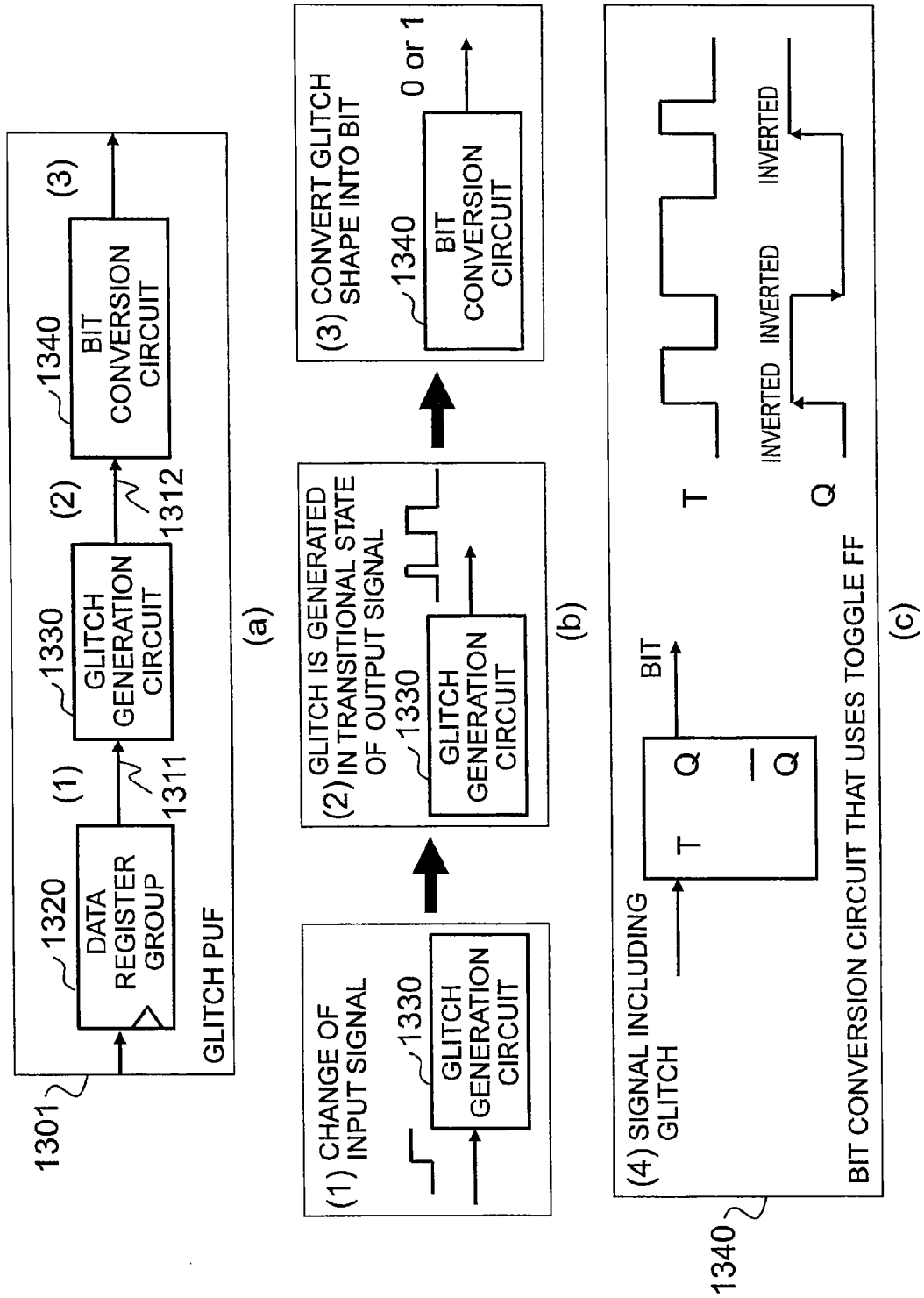
FIG. 13 are a diagram illustrating a basic configuration of a PUF disclosed in Patent Literature 1 and an explanatory diagram of specific signal processing.

Next, a detailed description is given of an operation of the glitch PUF 1001 having the configuration of FIG. 10 with reference to a flowchart. FIG. 11 is a flowchart of initial settings made by the glitch PUF 1001 illustrated in FIG. 10 according to the second embodiment of the present invention. Moreover, FIG. 12 is a flowchart of resettings made by the glitch PUF 1001 illustrated in FIG. 10 according to the second embodiment of the present invention.

First, with reference to FIG. 11, a description is given of a series of processing steps of the initial settings step by step. Note that, this flowchart of FIG. 11 is the one in which processing relating to key generation is added to the flowchart of FIG. 8 of the first embodiment. Specifically, Steps S1102 to S1105 are the same as Steps S801 to S804, respectively, and Steps S1101 and S1105 to S1108 correspond to steps that are newly added as the processing relating to key generation.

Step S1101: a step of inputting, by an encryption circuit 1090, a master key mk from an I/O 1083 to retain the input master key mk in an internal register.

Step S1102: a step of obtaining, by the control circuit 1055, a bit $b(1, 1, 1)$ to a bit $b(N, M, 2^n-1)$.

Step S1103: a step of evaluating, by the performance evaluation circuit 1054, the performances of the bits $b(1, 1, 1), \ldots, b(N, M, 2^n-1)$. Based on the result of evaluation, the performance evaluation circuit 1054 selects the index i (i=1, ..., N) satisfying a desired performance, and retains the index i in the memory 1082.

Step S1104: a step of generating, by the error correction circuit 1051, a syndrome s required for correcting an error of a bit sequence $w(i)=(b(i, 1, 1), \ldots, b(i, 1, 2^n-1))$ corresponding to the index i satisfying a desired performance when it is assumed that j=1, and retaining the generated syndrome s in the memory.

Step S1105: a step of calculating, by the OWHF circuit 1052, a hash value h of the bit sequence w(i) to retain the calculated hash value h in the memory 1082.

Step S1106: a step of calculating, by the HF circuit 1056, a hash value k of the bit sequence w(i) to retain the calculated hash value k in the internal register of the encryption circuit 1090. This value k corresponds to an encryption key generated with use of the glitch PUF 1001.

Step S1107: a step of encrypting, by the encryption circuit 1090, the master key mk with use of the encryption key k generated in Step S1106 to obtain encrypted data x. The encryption circuit 1090 retains the encrypted data x in the memory 1082.

Step S1108: a step of deleting, by the encryption circuit 1090, the master key mk and the encryption key k that are retained in the internal register.

In the above-mentioned flowchart of FIG. 11, there are two types of encryption key, that is, mk and k, but the master key mk is a key for actually encrypting the data and the encryption key k generated by the glitch PUF is a key for encrypting the master key mk. The reason why the encryption key k is not used to encrypt the data is that the output of the glitch PUF 1001 changes with the aged deterioration of the device and hence it becomes impossible to regenerate the same encryption key k as that generated in the initial settings at some point in time.

The flowchart of the initial settings has now been described. Through the series of processing steps described above, the performance evaluation/control unit 1050 can make the initial settings of the index i satisfying a desired performance, the syndrome s required for correcting an error of the bit sequence w(i), and the hash value h of the bit sequence w(i). The performance evaluation/control unit 1050 can further obtain the master key mk, generate the encryption key k, and generate the encrypted data x.

Next, with reference to FIG. 12, a description is given of a series of processing steps of resettings step by step. Note that, the flowchart of FIG. 12 is one in which processing relating to key management is added to the flowchart of FIG. 9 of the first embodiment. Specifically, Steps S1201 to S1208 are the same as Steps S901 to S908, respectively, Step S1211 is the same as Step S909, and Steps S1209, S1210, and S1212 correspond to steps that are newly added as the processing relating to key management.

Step S1201: a step of initializing, by the control circuit 1055, the value of the counter cnt with 0.

Step S1202: a step of controlling, by the control circuit 1055, the bit generation unit 1010 to generate a bit sequence w(i)' corresponding to the index determined in the above-mentioned initial settings.

Step S1203: a step of performing, by the error correction circuit 1051, the error correction processing on the bit sequence w(i)' to obtain a bit sequence w(i)".

Step S1204: a step of calculating, by the OWHF circuit 1052, a hash value h" of the bit sequence w(i)".

Step S1205: a step of comparing, by the comparison/determination circuit 1053, the hash value h" with the hash value h generated in the initial settings to branch the processing depending on the result of comparison.

Step S1206: a step of incrementing, by the control circuit 1055, the value of the counter cnt representing the count of failures in the error correction by 1 when the relationship of h≠h" is satisfied in Step S1205 to proceed to next Step S1207.

Step S1207: a step of determining, by the control circuit 1055, whether or not the value of the counter cnt exceeds a predetermined threshold value U. When the counter cnt does not exceed U, the processing returns to Step S1202 and the control circuit 1055 again generates the bit sequence and performs the error correction.

Step S1208: a step of issuing, by the control circuit 1055, a failure notification when the relationship of cnt>U is satisfied in Step S1207.

Step S1209: a step of calculating, by the HF circuit 1056, the hash value k of the bit sequence w(i)". The relationship of h=h" is satisfied in S1205, and hence a relationship of w(i)"=w(i) is also satisfied. The hash value k calculated here is therefore identical with the hash value k of w(i). This means that regeneration of the key generated in the initial settings results in success. The OWHF circuit 1052 retains the calculated hash value k as a regenerated key k in the internal register of the encryption circuit 1090.

Step S1210: a step of using, by the encryption circuit 1090, the regenerated key k to decode the data x, to thereby obtain the master key mk. The encryption circuit 1090 retains the master key mk in the internal register.

Step S1211: a step of determining, by the control circuit 1055, whether or not the value of the counter cnt exceeds the given threshold value V. When cnt does not exceed V, the control circuit 1055 proceeds to S1212.

Step S1212: a step of using, by the encryption circuit 1090, the master key mk to execute encryption processing.

Step S1213: a step of performing, by the performance evaluation/control unit 1050, the processing of the initial settings to select a new index i' and encrypt mk with use of a new key k' corresponding to the new index i' when the relationship of cnt>V is satisfied in Step S1211. This means that the performance evaluation/control unit 1050 determines that the circuit characteristics have changed significantly because the regeneration of the bit sequence w(i) has resulted in failure over and over again and makes the initial settings again before the bit sequence w(i) cannot be regenerated any longer (which means that k cannot be regenerated any longer) to select the new index i' again.

The flowchart of resettings has now been described. Through the series of processing steps described above, the performance evaluation/control unit 1050 can ensure that the glitch satisfying a desired performance (such as the amount of information and the error rate) is output without being influenced by the device manufacture or the aged deterioration of the device and can make the initial settings again as the need arises. It is also possible to realize application to the processing relating to key management.

As described above, according to the second embodiment, it is possible to generate the key to be used for the encryption algorithm with use of the generation of the bit sequence by the glitch PUF having the effects described above in the first embodiment. It is therefore possible to realize the application to the encryption processing.

The invention claimed is:

1. A device specific information generation device for generating specific information of a semiconductor device in the semiconductor device, comprising:
   a glitch generation circuit comprising logic circuits connected in series to have a multi-stage configuration, for outputting a plurality of different glitches generated in output signals of respective stages;
   a selector for receiving a selection signal from outside to select one glitch from among the plurality of different glitches output from the glitch generation circuit, and outputting the selected one glitch;
   a bit conversion circuit for converting a shape of the one glitch selected by the selector into bit information; and
   a performance evaluation and control unit for outputting the selection signal so that the plurality of different glitches are selected one by one to obtain respective pieces of bit information converted by the bit conversion circuit so as to correspond to the plurality of different glitches, evaluating performances of the obtained pieces of bit information to specify a glitch to be selected, and specifying the selection signal so that the specified glitch is output as the specific information of the semiconductor device.

2. The device specific information generation device according to claim 1, wherein the performance evaluation and control unit comprises an error rate evaluation circuit for repeatedly executing an operation of outputting the selection signal so that the plurality of different glitches are selected one by one to obtain each of pieces of bit information converted by the bit conversion circuit so as to correspond to each of the plurality of different glitches, and evaluating an error rate of the each of the plurality of different glitches based on a ratio of a number of times for which the obtained pieces of bit information match one another to a repetition count.

3. The device specific information generation device according to claim 2, wherein the performance evaluation and control unit comprises:
  an error correction circuit for correcting an error included in a bit sequence, which is input to the performance evaluation and control unit via the bit conversion circuit;
  an OWHF circuit for generating a hash value of the bit sequence that has been subjected to the error correction by the error correction circuit;
  a comparison/determination circuit for comparing the hash value generated by the OWHF circuit with a hash value generated previously;
  a performance evaluation circuit for evaluating the error rate or the amount of information as a performance of the bit sequence; and
  a control circuit for performing control so that the bit information converted by the bit conversion circuit is generated from a glitch satisfying a desired performance based on a result of the determination obtained by the comparison/determination circuit and a result of the evaluation obtained by the performance evaluation circuit.

4. The device specific information generation device according to claim 3, wherein the performance evaluation and control unit further comprises an HF circuit for randomizing the bit sequence that has been subjected to the error correction by the error correction circuit to obtain a hash value, to thereby generate an encryption key.

5. The device specific information generation device according to claim 1,
  wherein the single semiconductor device has mounted thereon a plurality of glitch generation circuit groups each comprising a plurality of glitch generation circuits having different circuit configurations,
  wherein the device specific information generation device further comprises a second selector for receiving a second selection signal from outside to select one output from among outputs of the plurality of glitch generation circuit groups, and outputting the selected one output to the bit conversion circuit, and
  wherein the performance evaluation and control unit comprises an information amount evaluation circuit for executing an operation of outputting the second selection signal so that the outputs of the plurality of glitch generation circuit groups are selected one by one and changing an n-bit input signal, where n is an integer of 2 or larger, to be input to each of the plurality of glitch generation circuit groups to obtain each of pieces of bit information converted by the bit conversion circuit so as to correspond to the each of the plurality of glitch generation circuit groups as a bit sequence having 2n−1 bits, and evaluating an amount of information of the each of the plurality of glitch generation circuit groups by counting a number of bits that are included in the bit sequence and have a bit value of 1.

6. The device specific information generation device according to claim 5, wherein the performance evaluation and control unit comprises:
  an error correction circuit for correcting an error included in a bit sequence, which is input to the performance evaluation and control unit via the bit conversion circuit;
  an OWHF circuit for generating a hash value of the bit sequence that has been subjected to the error correction by the error correction circuit;
  a comparison/determination circuit for comparing the hash value generated by the OWHF circuit with a hash value generated previously;
  a performance evaluation circuit for evaluating the error rate or the amount of information as a performance of the bit sequence; and
  a control circuit for performing control so that the bit information converted by the bit conversion circuit is generated from a glitch satisfying a desired performance based on a result of the determination obtained by the comparison/determination circuit and a result of the evaluation obtained by the performance evaluation circuit.

7. The device specific information generation device according to claim 6, wherein the performance evaluation and control unit further comprises an HF circuit for randomizing the bit sequence that has been subjected to the error correction by the error correction circuit to obtain a hash value, to thereby generate an encryption key.

8. The device specific information generation device according to claim 1, wherein the glitch generation circuit comprises a plurality of glitch generation circuits having different circuit configurations, and outputs respective output signals of the plurality of glitch generation circuits as the plurality of different glitches.

9. The device specific information generation device according to claim 8, wherein the performance evaluation and control unit comprises an error rate evaluation circuit for repeatedly executing an operation of outputting the selection signal so that the plurality of different glitches are selected one by one to obtain each of pieces of bit information converted by the bit conversion circuit so as to correspond to each of the plurality of different glitches, and evaluating an error rate of the each of the plurality of different glitches based on a ratio of a number of times for which the obtained pieces of bit information match one another to a repetition count.

10. The device specific information generation device according to claim 9, wherein the performance evaluation and control unit comprises:
  an error correction circuit for correcting an error included in a bit sequence, which is input to the performance evaluation and control unit via the bit conversion circuit;
  an OWHF circuit for generating a hash value of the bit sequence that has been subjected to the error correction by the error correction circuit;
  a comparison/determination circuit for comparing the hash value generated by the OWHF circuit with a hash value generated previously;
  a performance evaluation circuit for evaluating the error rate or the amount of information as a performance of the bit sequence; and
  a control circuit for performing control so that the bit information converted by the bit conversion circuit is generated from a glitch satisfying a desired performance based on a result of the determination obtained by the comparison/determination circuit and a result of the evaluation obtained by the performance evaluation circuit.

11. The device specific information generation device according to claim 10, wherein the performance evaluation and control unit further comprises an HF circuit for randomizing the bit sequence that has been subjected to the error correction by the error correction circuit to obtain a hash value, to thereby generate an encryption key.

12. The device specific information generation device according to claim 8,
wherein the single semiconductor device has mounted thereon a plurality of glitch generation circuit groups each comprising a plurality of glitch generation circuits having different circuit configurations,
wherein the device specific information generation device further comprises a second selector for receiving a second selection signal from outside to select one output from among outputs of the plurality of glitch generation circuit groups, and outputting the selected one output to the bit conversion circuit, and
wherein the performance evaluation and control unit comprises an information amount evaluation circuit for executing an operation of outputting the second selection signal so that the outputs of the plurality of glitch generation circuit groups are selected one by one and changing an n-bit input signal, where n is an integer of 2 or larger, to be input to each of the plurality of glitch generation circuit groups to obtain each of pieces of bit information converted by the bit conversion circuit so as to correspond to the each of the plurality of glitch generation circuit groups as a bit sequence having 2n−1 bits, and evaluating an amount of information of the each of the plurality of glitch generation circuit groups by counting a number of bits that are included in the bit sequence and have a bit value of 1.

13. The device specific information generation device according to claim 12, wherein the performance evaluation and control unit comprises:
an error correction circuit for correcting an error included in a bit sequence, which is input to the performance evaluation and control unit via the bit conversion circuit;
an OWHF circuit for generating a hash value of the bit sequence that has been subjected to the error correction by the error correction circuit;
a comparison/determination circuit for comparing the hash value generated by the OWHF circuit with a hash value generated previously;
a performance evaluation circuit for evaluating the error rate or the amount of information as a performance of the bit sequence; and
a control circuit for performing control so that the bit information converted by the bit conversion circuit is generated from a glitch satisfying a desired performance based on a result of the determination obtained by the comparison/determination circuit and a result of the evaluation obtained by the performance evaluation circuit.

14. The device specific information generation device according to claim 13, wherein the performance evaluation and control unit further comprises an HF circuit for randomizing the bit sequence that has been subjected to the error correction by the error correction circuit to obtain a hash value, to thereby generate an encryption key.

15. A device specific information generation method for generating specific information of a semiconductor device in the semiconductor device, comprising:
a glitch generation step of outputting a plurality of different glitches generated in output signals of respective stages by using a circuit having logic circuits connected in series to have a multi-stage configuration;
a glitch selection step of receiving a selection signal from outside to select one glitch from among the plurality of different glitches output in the glitch generation step;
a bit conversion step of converting a shape of the one glitch selected in the glitch selection step into bit information; and
a performance evaluation and control step of outputting the selection signal so that the plurality of different glitches are selected one by one to obtain respective pieces of bit information converted in the bit conversion step so as to correspond to the plurality of different glitches, evaluating performances of the obtained pieces of bit information to specify a glitch to be selected, and specifying the selection signal so that the specified glitch is output as the specific information of the semiconductor device.

* * * * *